(12) United States Patent
Kwon

(10) Patent No.: US 7,025,325 B2
(45) Date of Patent: Apr. 11, 2006

(54) FLOW CONTROL VALVE

(76) Inventor: Tae Moug Kwon, 44 Yongdu-ri, Miyang-myun, Ansung-si, Kyonggi-do (KR)

( * ) Notice: Subject to any disclaimer, the term of this patent is extended or adjusted under 35 U.S.C. 154(b) by 98 days.

(21) Appl. No.: 10/803,331

(22) Filed: Mar. 17, 2004

(65) Prior Publication Data

US 2004/0183040 A1    Sep. 23, 2004

(30) Foreign Application Priority Data

Mar. 18, 2003    (KR) ................ 10-2003-0016721

(51) Int. Cl.
*F16K 31/00* (2006.01)
*F16K 31/12* (2006.01)
*F16K 31/44* (2006.01)
(52) U.S. Cl. .................... 251/14; 251/31; 251/305
(58) Field of Classification Search ............ 251/14, 251/314, 305; 92/136
See application file for complete search history.

(56) References Cited

U.S. PATENT DOCUMENTS

| 2,608,374 | A | * | 8/1952 | Morehead | 137/246.14 |
| 3,801,062 | A | * | 4/1974 | Arn et al. | 251/14 |
| 4,679,764 | A | * | 7/1987 | Smith et al. | 251/14 |
| 6,155,531 | A | * | 12/2000 | Holborow et al. | 251/30.02 |

* cited by examiner

*Primary Examiner*—Edward K. Look
*Assistant Examiner*—John K. Fristoe, Jr.
(74) *Attorney, Agent, or Firm*—Lee, Hong, Degerman, Kang & Schmadeka

(57) ABSTRACT

Disclosed is a flow control valve capable of controlling a flow amount of air, gas or fluid inside a pipe. The flow control valve has a relatively simple structure, which can reduce manufacturing expenses, minimize malfunction and wrong driving, and allow a rapid repair and replacement of components.

1 Claim, 3 Drawing Sheets

FLOW CONTROL VALVE

BACKGROUND OF THE INVENTION

1. Field of the Invention

The present invention relates to a flow control valve capable of controlling a flow amount of air, gas or fluid inside a pipe, and more particularly, to a flow control valve having a relatively simple structure, which can reduce manufacturing expenses, minimize malfunction and wrong driving, and allow a rapid repair and replacement of components.

2. Background of the Related Art

In general, a flow control valve is mounted inside a pipe, in which air, gas or fluid flows, for intercepting a flow of the air, gas or fluid or controlling a flow amount of them. Such flow control valve is used in a manufacturing factory, a high-storied apartment, a boiler room, and others.

There are flow control valves of various kinds according to a use purpose: a balancing valve for adjusting an opened volume of a valve manually and controlling a flow amount according to the adjusted level of the opened volume; an automatic flow control valve for keeping a controlled flow amount in a uniform condition by sensing a load change occurring in a circuit, a differential-pressure flow control valve mounted in a return pipe of a load device for keeping a flow amount in a uniform condition by keeping a proper differential pressure of the load device, and so on.

The flow control valve frequently obstructs the speed reduction and pressure of flow of fluid as being mounted at right angles to the pipe in which fluid flows, and so, recently, a flow control valve having a throttle is widely used.

The flow control valve controls the flow amount according to the movement of the throttle built in the pipe. Now, an improved flow control valve which is automatically controlled has been used, and it can control the flow amount by an automatic movement of the throttle at the time of a sudden flow change.

However, the flow control valve has several problems in that its structure is complicated as an automatic control device is mounted to the flow control valve, and in that it frequently causes malfunction and wrong driving in use.

Furthermore, the flow control valve has another problem in that it requires lots of manufacturing expenses due to the complicated structure.

SUMMARY OF THE INVENTION

Accordingly, the present invention is directed to a flow control valve that substantially obviates one or more problems due to limitations and disadvantages of the related art.

An object of the present invention is to provide a flow control valve of a simple structure, which can reduce manufacturing expenses, minimize malfunction and wrong driving in used, and allow a rapid and accurate replacement of components.

To achieve the object and other advantages and in accordance with the purpose of the invention, as embodied and broadly described herein, the flow control valve for controlling a flow amount of fluid comprises: a valve member having a rotary shaft having a saw-toothed portion formed on the outer surface thereof and rotating in right and left directions by a movable shaft, a valve body having a space for inserting and fixing the rotary shaft therein, a cover fixed on the upper portion of the valve body for preventing separation of the rotary shaft, a solenoid valve for injecting the air into the space of the valve body or recovering the air from the space of the valve body, and a discharge valve for discharging the injected air of the valve body; a control member through which a pipe passes, the control member having a control means for controlling the flow amount inside the pipe according to the right and left rotation of a throttle, a connection shaft disposed on the upper portion of the throttle and coupled with the rotary shaft, and a coupling plate fixed on the lower surface of the valve body; a piston member having a saw-toothed portion coupled with the saw-toothed portion of the rotary shaft, the piston member having a piston moved in right and left directions by the injected air of the solenoid valve for rotating the rotary shaft, and piston chambers fixed on both sides of the valve body for allowing insertion and movement of the piston; and a manual member inserted and fixed into a hole formed in a side of the valve body, the manual member having a rotary gear disposed therein, a rotating means coupled with the rotary shaft according to a rotation angle, a fixed means fixed in front of the rotating means for rotating and fixing the rotating means, and a rotary handle mounted at an end of the rotary gear of the rotating means for providing the rotating means with rotary power.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
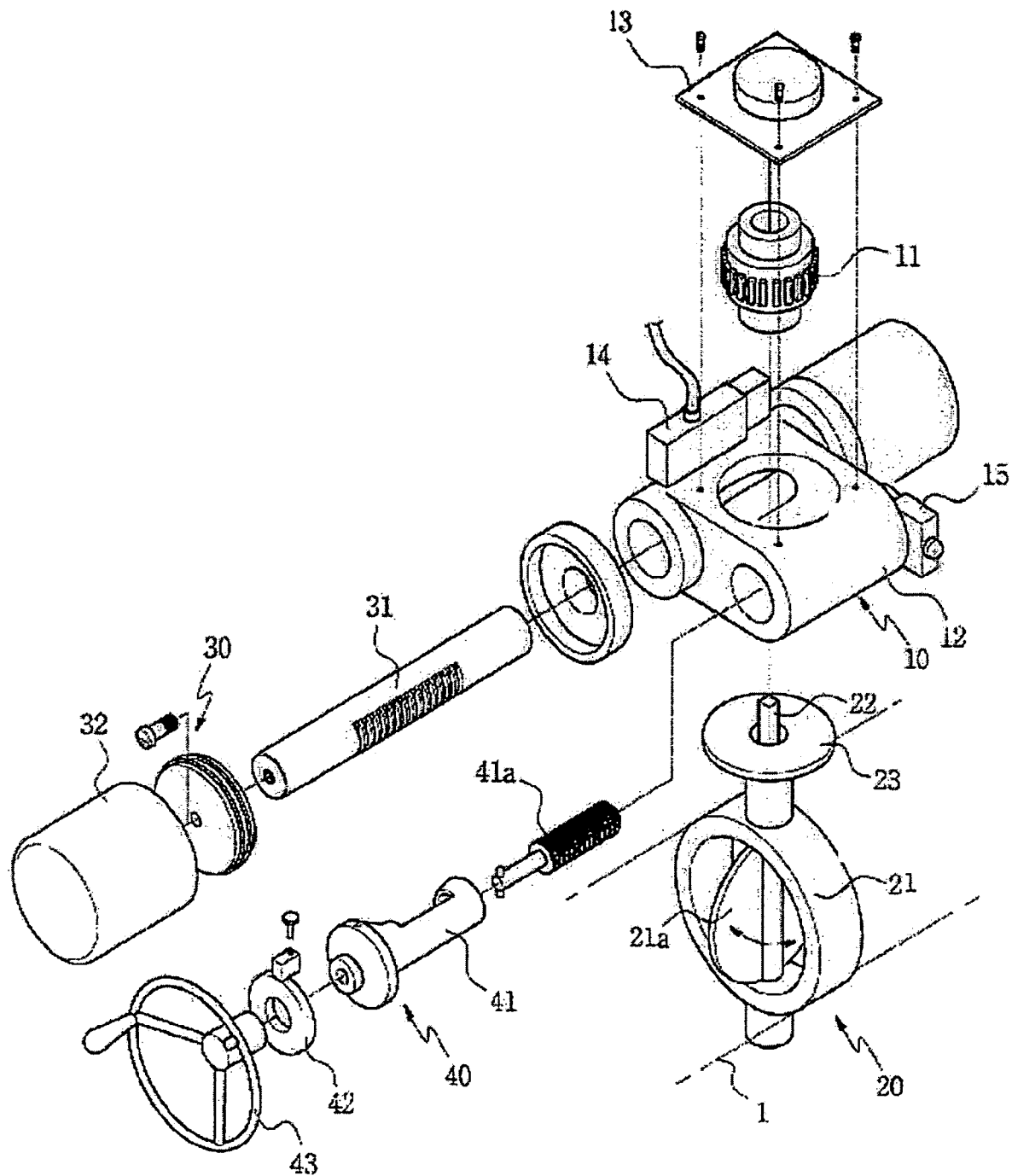
FIG. 1 is an exploded perspective view of a flow control valve according to the present invention.
Figure 2:
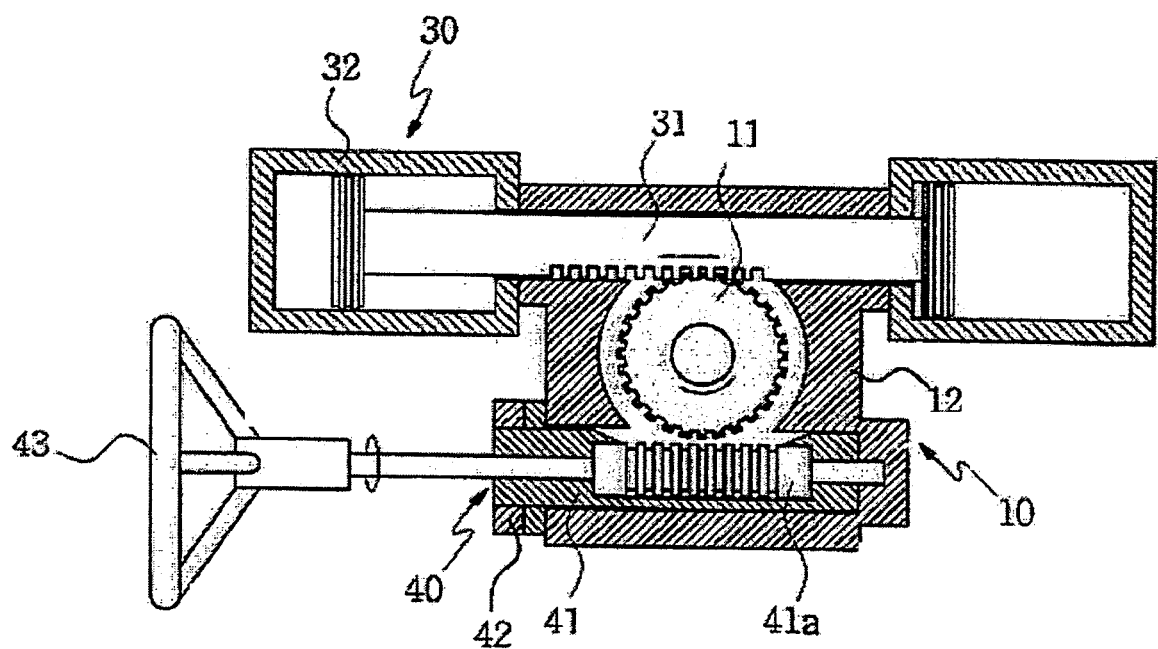
FIG. 2 is a plan sectional view of the flow control valve;.
Figure 3:
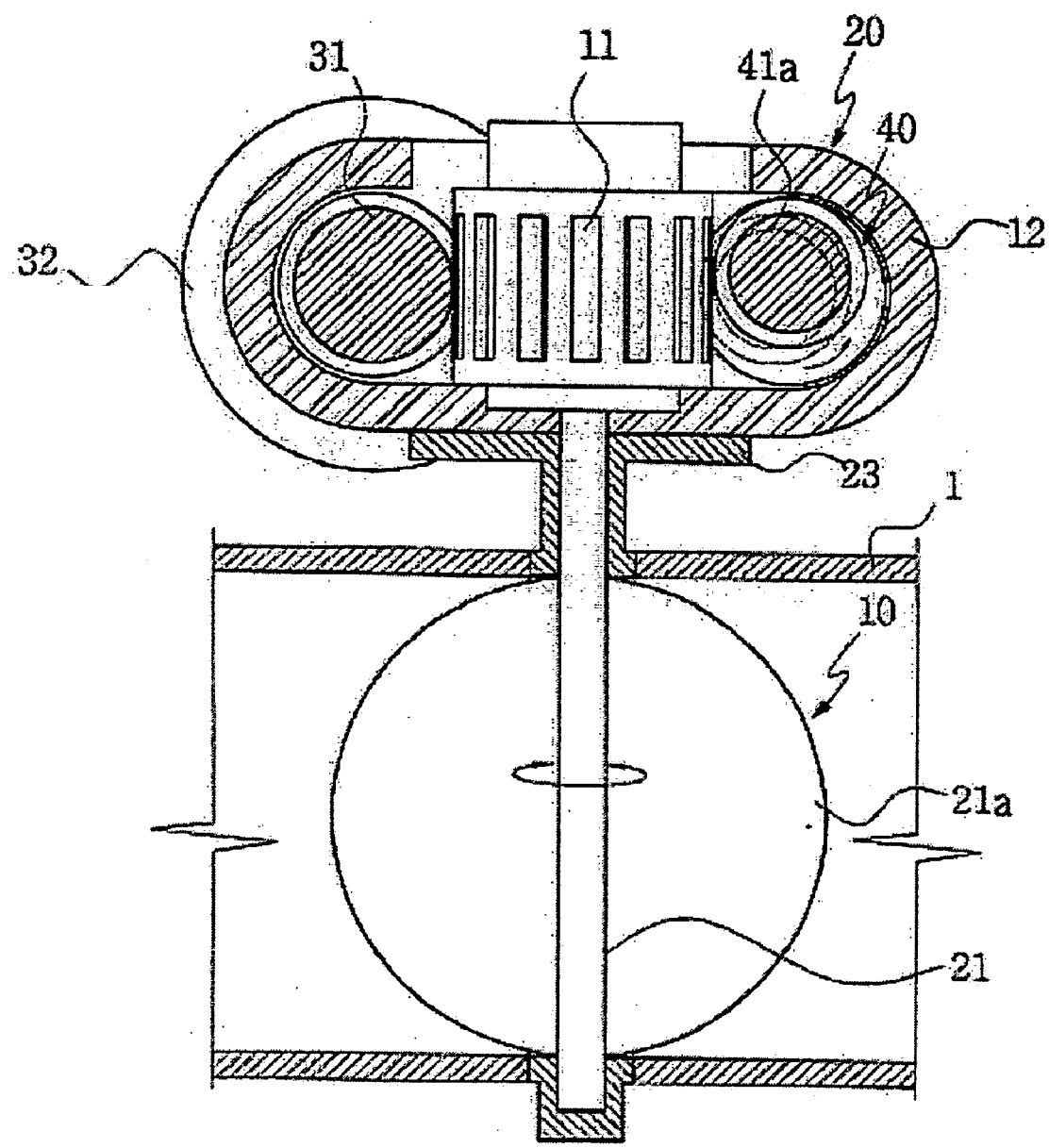
FIG. 3 is a side sectional view of the flow control valve.

FIG. 1 is an exploded perspective view of a flow control valve according to the present invention, FIG. 2 is a plan sectional view of the flow control valve, and FIG. 3 is a side sectional view of the flow control valve.

As shown in FIGS. 1 and 2, the flow control valve includes: a valve member 10 for rotating a throttle in right and left directions for controlling a flow amount of fluid inside a pipe; a control member 20 mounted on the lower surface of the valve member 10 for controlling the flow amount by the control of the valve member 10; a piston member 30 connected to the valve member 10 for providing the rotary shaft with rotary power according to the right and left rotation thereof; and a manual member 40 inserted and fixed into a hole formed in a side surface of the valve member 10 for rotating the throttle according to the rotation angle.

The valve member 10 includes: a rotary shaft 11 having a saw toothed portion formed on the outer surface thereof and rotating in right and left directions by a movable shaft; a valve body 12 having a space for inserting and fixing the rotary shaft 11 therein; a cover 13 fixed on the upper portion of the valve body 12 for preventing separation of the rotary shaft 11; a solenoid valve 14 for injecting the air into the space of the valve body 12 or recovering the air from the space of the valve body 12; and a discharge valve 15 for discharging the injected air of the valve body 12.

The rotary shaft 11 is inserted and fixed into the valve body 12, and has the saw-toothed portion formed on the outer surface thereof. It is preferable that the saw-toothed portion has a concavely curved form to enlarge a coupling area.

The valve body 12 has the space for receiving the rotary shaft 11, the piston member 30 and the manual member 40, and includes piston holes formed in both sides thereof for moving the injected air to the piston member 30 by the control of the solenoid valve 14, and a discharge hole connected with the discharge valve 14

The cover 13 is fixed on the upper surface of the valve body 12 by bolts so as to prevent separation of the rotary shaft. It is preferable that a rubber member or a gasket is interposed between the cover 13 and the valve body 12.

The solenoid valve 14 inhales and recovers the air by control signal of a control box mounted at the outside of the flow control valve. It is preferable that a solenoid valve of a 4 port 2-position type is used.

Moreover, the solenoid valve 14 includes a connection wire connected with the outside control box, and a connection pipe connected with a pneumatic line discharging pneumatic pressure.

The discharge valve 15 is connected with the discharge pipe of the valve body 12 for discharging the air of the valve body 12 to the outside, and has a switch for allowing the connection and interception of the discharge pipe by a user's press.

The pipe 1 passes through the control member 20, and the control member 20 includes a control means 21 for controlling the flow amount inside the pipe 1 according to the right and left rotation of a throttle 21a, a connection shaft 22 mounted on the upper portion of the throttle 21a and connected with the rotary shaft 11, and a coupling plate 23 coupled and fixed to the lower surface of the valve body 12.

The control means 21 rotates the throttle 21a in the right and left directions by the rotary shaft for controlling the flow amount of the fluid inside the pipe 1.

The connection shaft 22 connects the throttle 21a with the rotary shaft 11, and it is preferable that the connection shaft 22 is manufactured in a rectangular form for providing an exact rotary power.

The coupling plate 23 is fixed on the lower surface of the valve body 12 by bolts, and it is preferable that a rubber member or a gasket is interposed between the coupling plate 23 and the valve body 12 to keep sealability.

The piston member 30 has a saw-toothed portion coupled with the saw-toothed portion of the rotary shaft 11. The piston member 30 includes a piston 31 moving in right and left directions by the injected air of the solenoid valve 14, and piston chambers 32 fixed at both sides of the valve body 12 for movably inserting the piston 31 therein.

The piston 31 is inserted into the holes formed in the both sides of the valve body, and has the saw-toothed portion, which is formed on the outer surface thereof and coupled with the saw-toothed portion of the rotary shaft, for rotating the rotary shaft according to the back and forth movement of the piston. It is preferable that the saw-toothed portion of the piston has an inclined angle, which allows the coupling between the piston 31 and the rotary shaft, i.e., about 120 degrees, to prevent friction due to the movement of the piston 31.

In addition, it is preferable that the piston 31 has a number of sealing rings mounted on ground positions between the piston 31 and the piston chambers 32.

The piston chambers 32 are fixed to both sides of the valve body 12, and respectively have spaces for moving the piston 31.

As shown in FIG. 3, the manual member 40 is inserted and fixed into a hole formed in a side portion of the valve body 12, and includes a rotary gear 41a positioned inside the manual member 41, a rotating means 41 coupled with the rotary shaft 11 according to the rotation angle, a fixed means 42 fixed in front of the rotating means 41 for rotating and fixing the rotating means 41, and a rotary handle 43 mounted at an end of the rotary gear 41a of the rotating means 41 for providing the rotating means 41 with rotary power.

The rotating means 41 is inserted and fixed into the hole of the side portion of the valve body 12, rotated at an angle of about 90 degrees, and has the rotary gear having a saw-toothed portion formed therein.

The fixed means 42 is fixed in front of the rotating means 41, and rotates and fixes the rotating means 41 at an angle of about 90 degrees. It is preferable that a bolt is used for fixing the rotating means 41.

The rotary handle 43 is coupled with the rotary gear of the rotating means 41 and provides the rotary gear with rotary power.

In the drawings, the unexplained reference numeral 1 designates the pipe.

As set forth above, the function and effect of the present invention will be described referring to the drawings as follows.

As shown in FIGS. 1 and 2, when an excessive flow amount more than a value set by the outside control box or a flow amount less than the set value is flown in, the control box. transmits control signal to the solenoid valve 13.

According to the control signal, the solenoid valve 13 injects the air into the piston hole of the valve body 12 according to the excess or shortage of the flow amount, and then, the piston 31 of the piston member 30 moves in the right and left directions inside the piston chamber 32 by the injection of the air.

The rotary shaft 11 is rotated by the movement of the piston 31, and at this time, the throttle 12a of the control means 21 is rotated in the right and left directions by the coupling between the rotary shaft 11 and the connection shaft 22, so that the flow amount inside the pipe 1 can be controlled.

At this time, the cover 13 is fixed on the upper surface of the valve body 12, and the coupling plate 23 is fixed on the lower surface of the valve body 12 so as to prevent separation of the valve member 10 due to the rotation of the rotary shaft 11 and to prevent leakage of the air.

When the flow amount is induced into the pipe to the contrary from the above, the solenoid valve 14 inject the air into the other piston hole of the valve body 12, and then, the air injected into the valve body 12 is recovered to a storage tank by the solenoid valve 14.

As described above, the piston 31 is moved in the opposite direction by the air induced into the other piston hole, and then, the throttle 21a is rotated in the opposite direction to control the flow amount.

When the valve member 10 is out of order or works wrong due to a long-term use, the user presses the switch of the discharge valve 15 to discharge the air of the valve body 12 to the outside, and then, rotates the rotating means 41 at an angle of 90 degrees to couple the rotary shaft 11 with the rotating means 41 after removing the bolts of the fixed means 42.

After the rotary shaft 11 is coupled with the rotating means 41, when the user rotates the rotary handle 43 in the right and left directions, the rotary gear 41*a* of the rotating means 41 is rotated to rotate the throttle 21*a* in the right and left directions, so that it is prevented to stop a manufacturing process due to the malfunction and wrong operation of the valve member 10. In addition, the prevent invention is easy in replacement of components and can be driven again quickly as the structure of the flow control valve is relatively simple.

As described above, the present invention has a simple structure in which the piston is moved according to the air injection and recovery by the solenoid valve mounted on the valve body, and thereby, the throttle is rotated in the right and left directions. So, the present invention can minimize malfunction and wrong driving of the flow control valve, reduce manufacturing expenses, normally drive the flow control valve by using the manual member if the flow control valve is out of order, and replace and repair the components rapidly.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A flow control valve for controlling a flow amount of fluid, the flow control valve comprising:

a valve member having a rotary shaft having a saw-toothed portion formed on the outer surface thereof and rotating in right and left directions by a movable shaft, a valve body having a space for inserting and fixing the rotary shaft therein, a cover fixed on the upper portion of the valve body for preventing separation of the rotary shaft, a solenoid valve for injecting the air into the space of the valve body or recovering the air from the space of the valve body, and a discharge valve for discharging the injected air of the valve body;

a control member through which a pipe passes, the control member having a control means for controlling the flow amount inside the pipe according to the right and left rotation of a throttle, a connection shaft disposed on the upper portion of the throttle and coupled with the rotary shaft, and a coupling plate fixed on the lower surface of the valve body;

a piston member having a saw-toothed portion coupled with the saw-toothed portion of the rotary shaft, the piston member having a piston moved in right and left directions by the injected air of the solenoid valve for rotating the rotary shaft, and piston chambers fixed on both sides of the valve body for allowing insertion and movement of the piston; and a manual member inserted and fixed into a hole formed in a side of the valve body, the manual member having a rotary gear disposed therein, a rotating means coupled with the rotary shaft according to a rotation angle, a fixed means fixed in front of the rotating means for rotating and fixing the rotating means, and a rotary handle mounted at an end of the rotary gear of the rotating means for providing the rotating means with rotary power.

* * * * *